United States Patent
Legaz et al.

(10) Patent No.: US 6,382,435 B1
(45) Date of Patent: May 7, 2002

(54) COLLAPSIBLE FOLDING CONTAINER WITH FRAMES CONNECTED BY SCISSOR ARMS

(75) Inventors: Juan Garcia Legaz, Ceuvas de Reyllo; Francisco Martin Alfonseca, La Redondela, both of (ES)

(73) Assignee: Euroecoenvase, S.L., La Redondela (ES)

( * ) Notice: Subject to any disclaimer, the term of this patent is extended or adjusted under 35 U.S.C. 154(b) by 0 days.

(21) Appl. No.: 09/322,985

(22) Filed: Jun. 1, 1999

(30) Foreign Application Priority Data

Oct. 7, 1998 (ES) .................................... 9802080

(51) Int. Cl.[7] .......................... B65D 85/00; B65D 88/52
(52) U.S. Cl. ...................... 211/207; 211/175; 211/187; 211/149
(58) Field of Search .................. 211/207, 175, 211/187, 1.51, 1.57, 149

(56) References Cited

U.S. PATENT DOCUMENTS

| 1,180,193 A | * | 4/1916 | Ruetten | ..................... 38/102.8 |
| 1,769,140 A | * | 7/1930 | Kaufman | ..................... 211/202 |
| 2,645,538 A | | 7/1953 | Segal | |
| 4,249,749 A | | 2/1981 | Collier | |
| 5,033,758 A | | 7/1991 | Levy | |
| 5,211,296 A | * | 5/1993 | D'Heygere | .................. 211/187 |
| 5,423,503 A | * | 6/1995 | Tanaka et al. | ........... 248/277.1 |

FOREIGN PATENT DOCUMENTS

| EP | 0 537 433 | 4/1993 |
| FR | 2 521 425 | 8/1983 |

* cited by examiner

Primary Examiner—Gregory J. Strimbu
(74) Attorney, Agent, or Firm—Rothwell, Figg, Ernst & Manbeck

(57) ABSTRACT

A folding container with two equal frames (1, 2), which are parallel and superimposed, at least one pair of folding arms (5, 6) formed of flat structured scissors elements which connect the two frames (1, 2), a series of intermediate detachable trays (18, 19), assembled at different heights between each pair of folding arms, and at least two mounting columns (20) each made up of at least two telescopic sections (21, 22) the columns being attached at one end to a top frame (1) of the two equal frames, while at the opposite end they are attached to a lower frame (2) of the two equal frames. The arms (5, 6) permit relative movement of the frames (1, 2) between a maximum separation mounting position and a folded or minimum separation position.

9 Claims, 8 Drawing Sheets

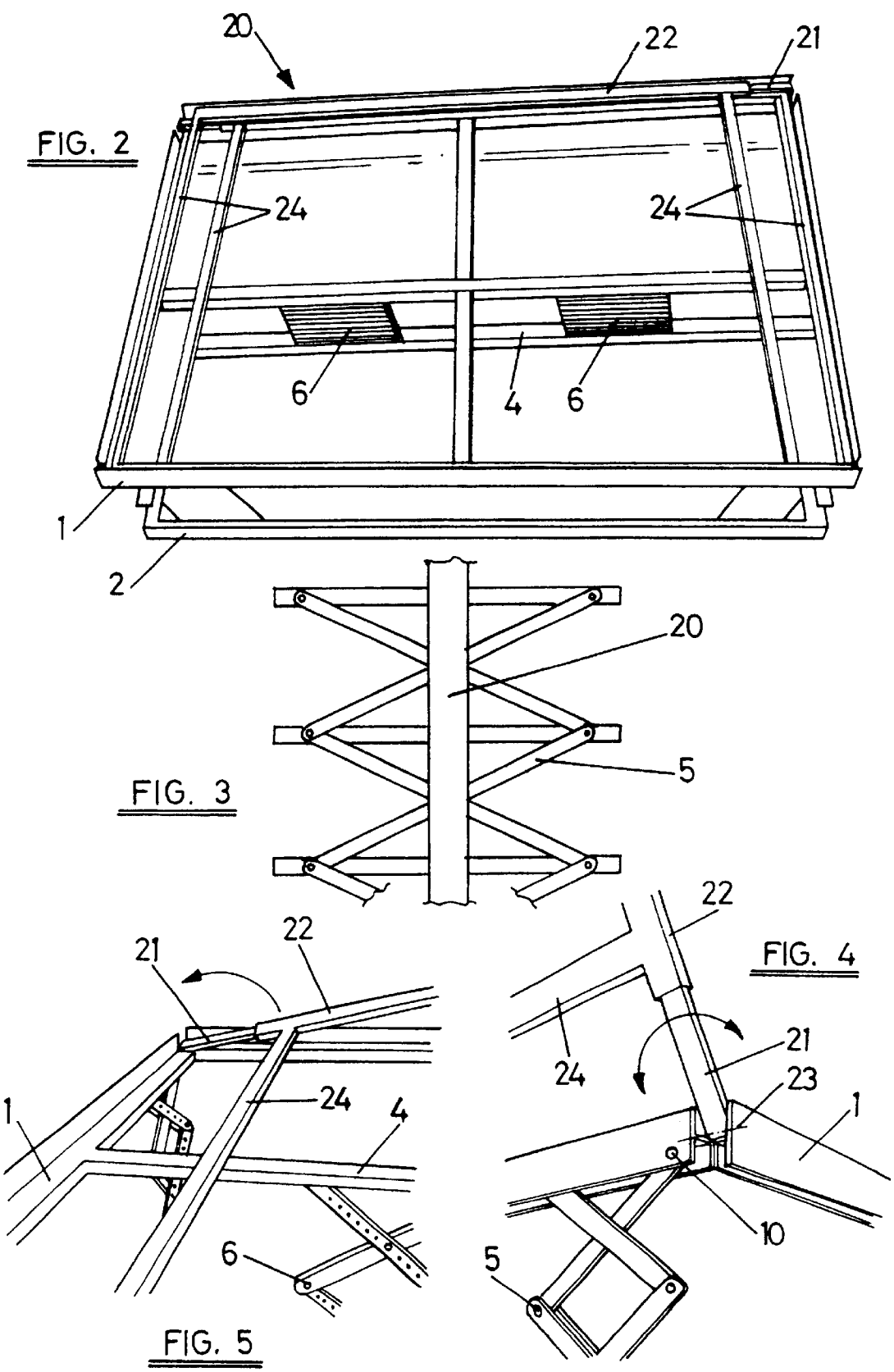

COLLAPSIBLE FOLDING CONTAINER WITH FRAMES CONNECTED BY SCISSOR ARMS

BACKGROUND OF THE INVENTION

1. Field of the Invention

The present invention refers to a folding and reusable container, especially conceived for products in bulk, provided with supporting wheels to facilitate its movement, and which may change from a mounted position, with great loading capacity to a folded position in which its volume is considerably reduced.

2. Description of the Related Art

Folding containers for the described purpose are already known, which include a platform with or without supporting wheels, and walls which articulate or connect to said platform and which are capable of occupying a mounted position, in which they are placed perpendicular to the platform, delimiting a chamber or cavity capable of being filled with the product to be transported, and a folding position, in which the walls remain collapsed and superposed on the platform, or else folded and separated from the same.

In any case, the container delimits a hollow or enclosure which is filled with the product to be transported, laying units over other units in such a manner, that this type of containers cannot be used for the transportation of delicate articles, such as specific types of fruit, the transportation of which must be carried out on individual trays on which one or two layers of products can be placed.

BRIEF SUMMARY OF THE INVENTION

The object of the present invention is to solve the problems pointed out, by means of a container of great capacity, which permits the transportation of delicate articles, without risk of deterioration, and which nerves for the transportation and storage of the products contained and also as exhibitor of the same, in such a way, that once the container has been loaded, it is not necessary to handle or touch the product again, until its final shipment or sale.

Additionally, the container of the invention is provided with wheels, so that it facilitates its movement over storehouses and selling surfaces.

An added advantage of the invention is that both the folding and the mounting operations can be performed in a highly simple and rapid manner.

The container of the invention is constituted by a highly resistant folding structure, comprised for example of steel, making it reusable and capable of being subjected to any type of cleaning operations, to ensure its hygienic conditions.

The container of the invention is comprised of two equal, parallel and superposed frames, an upper and a lower one, consisting of metallic profiles, preferably in "U" cross section, confronted on the two frames. These two frames are related by at least one pair of folding arms, preferably constituted by flat structured elements in the form of scissors, made up of a pair of articulated flat bars, one of them at the end of each pair of flat bars being articulated at its free end to the adjacent side of the corresponding frame, whilst the other is slidable along the section of said frame. Said scissors permitting the relative movement of the frames between maximum and minimum separation positions.

Each pair of scissors shall be coplanar to each other, and the container may include one or more pairs of said scissors, each one of them corresponding with two of the opposite sides of the frames. The frames may also be provided with crosspieces coinciding at their axis, also comprised by confronted "U" shaped profiles, between which at least one pair of folding arms may be assembled, constituted by scissors of equal constitution as those described.

The receptacle also includes at least two stiff mounting columns, which are articulated at an end to the upper frame, according to parallel axes, aligned in twos, which shall permit the tilting of said columns between a collapsible top position on the frame and a vertical mounting position, with which it shall bear on the lower frame and ensure the assembly stability with the frame at the maximum separation position. Said columns shall be preferably comprised of two telescopic sections, including anchorage means for its attachment on the extended position of the container mounting. Additionally, the end section of each pair of columns with aligned articulation axes are related to each other by means of at least one crosspiece which runs between the free ends of the section, said crosspiece bearing on the parallel profile of the lower frame in the vertical mounted position.

Finally, the receptacle is completed with a series of detachable intermediate trays which are assembled at different heights between each pair of folding arms. For this, said arms shall be provided with isolated or continuous anchorage, on which the trays shall lie, the height of the same being able to be selected and of occupying a horizontal or inclined position for respective transportation and exposition situations.

The lower frame carries supporting wheels and is also assembled with diverse flat structures along the length of the sides parallel to the articulation axes of the mounting columns, said structures being vertically moveable as regards said frame, between an upper position, where they remain placed over the wheel supporting surfaces, and a lower position where they are placed on the floor, on the same plane as the wheels, receiving from the top, the support of the stiff mounting columns. In this second position, said flat structures act as supporting elements on the floor, preventing the accidental movement of the container.

In accordance to a second type of the present invention, the columns which relate the two frames include a lower section with shorter height, and an upper telescopic post. The lower section, of tubular configuration, is attached to the lower frame. The telescopic post articulates with the lower section according to an axis, parallel to one of the frame side. The post may tilt around said axis, between a mounted position, at which it remains as an extension of the lower section, and a folded position, where it remains collapsed towards the interior of the mountings, in approximately parallel position to one of the frame sides.

The posts shall be provided with a lever assembly which shall permit the simultaneous activation on the post or the posts on one and the other side, so as to change from the folded position to the mounted position and vice versa, and also to control the relative position between the two sections of the telescopic post, permitting their placement in positions of maximum or minimum length.

The upper frame of the container is dismountable. To achieve this, the internal section of the telescopic post of the four columns and the upper frame are provided with coupling confronted elements, by means of which a rapid and safe attachment system is obtained.

According to another characteristic of the invention, the folding arms are provided in their interior with profiles placed at different heights, all of them equal, which delimit guides for the assembly of the trays by sliding.

On the lower section of the columns a leg is telescopically coupled, as from the lower end of said sections, which is pushed in ascending direction towards a retracted position by means of a spring assembled on said section and leg. On the upper end of this leg the associated post rests, both in the mounted assembly position and in the folded position. In this manner, when the weight transmitted by the post overcomes the force of the spring, the telescopic legs descend, bearing the lower end on the floor to serve as braking element. For this, said legs shall be equipped at the lower end with a wedge or supporting element of appropriate nature.

According to a variation, each leg may be equipped with an individual brake, activated from the outside.

The described characteristics, as well as others which belong to the invention and the advantages derived from the same, may be better understood from the following description, made with reference to the enclosed drawings, in which a possible form of embodiment is shown, offered as non limitative example.

BRIEF DESCRIPTION OF THE SEVERAL VIEWS OF THE DRAWINGS

In the drawings:

FIG. 2 is a simplified perspective view of the same container in folded position;

FIG. 3 represents a partial elevational view of how the container would be constituted with a pair of folding arms and a pair of columns;

FIGS. 4 and 5 correspond to detail A of FIG. 1, from a different angle and with the mounting columns in different positions;

FIG. 8A is a detail of the upper telescopic post of the container of FIG. 7;

DETAILED DESCRIPTION OF THE INVENTION

Figure 1:
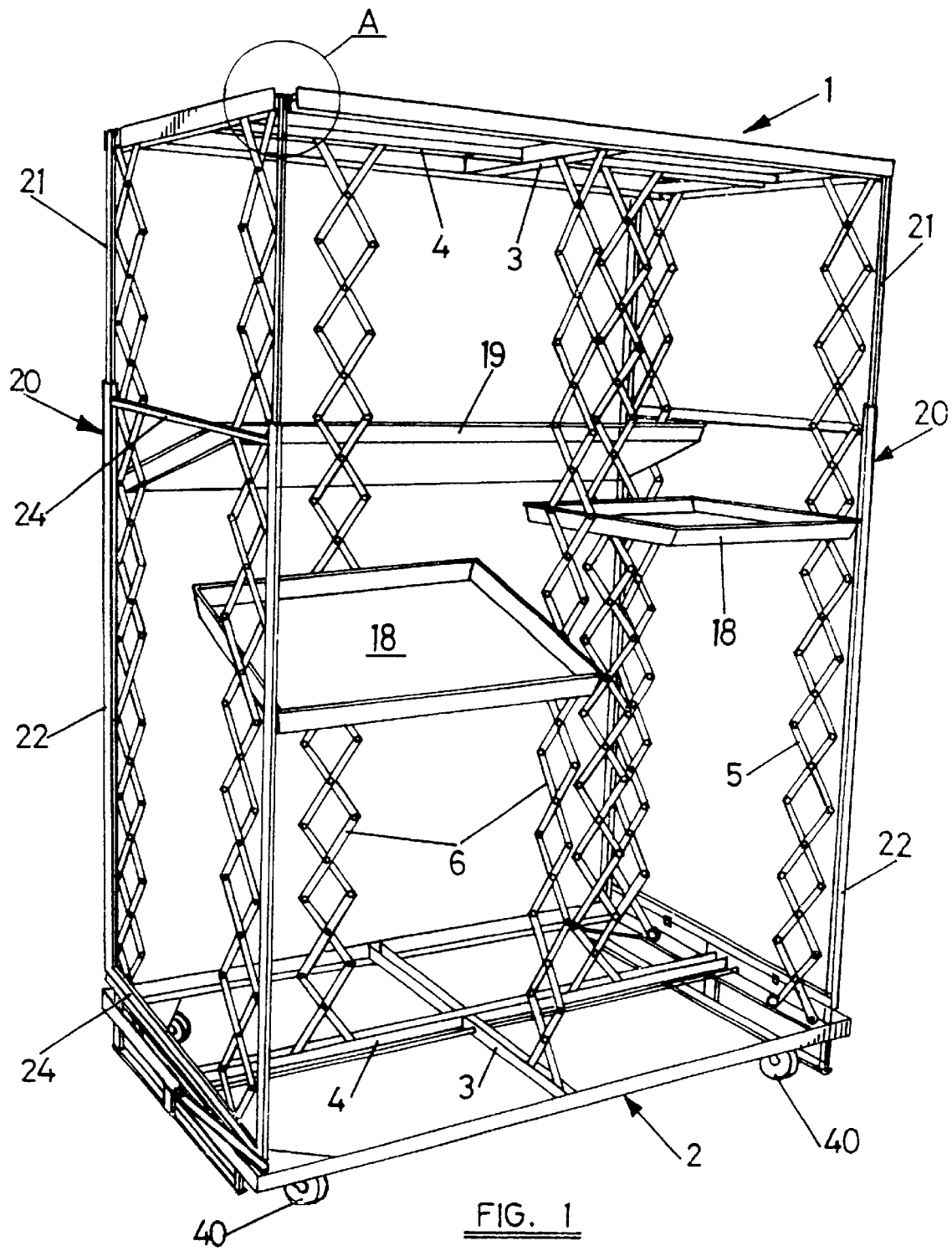
FIG. 1 is a perspective view of a container, constituted according to the invention, shown in mounted position.

The container represented in FIG. 1 is constituted by two equal, parallel and superposed frames, one upper frame referenced with number 1, and the other lower frame referenced with number 2.

Preferably, said frames 1 and 2 shall be of rectangular contour and may be crossed by transversal 3 and longitudinal 4 central bars. Frames 1 and 2 are related by pairs of folding arms made up of scissors 5, assembled between opposite sides of frames 1 and 2, also capable of including intermediate scissors 6 assembled between the transversal 3 and longitudinal 4 central bars of the two frames.

The folding arms or scissors 5 and 6 permit the relative movement of frames 1 and 2 between positions of maximum separation or mounting, shown in FIG. 1 or of minimum separation or folding, shown in FIG. 2.

Figure 6:
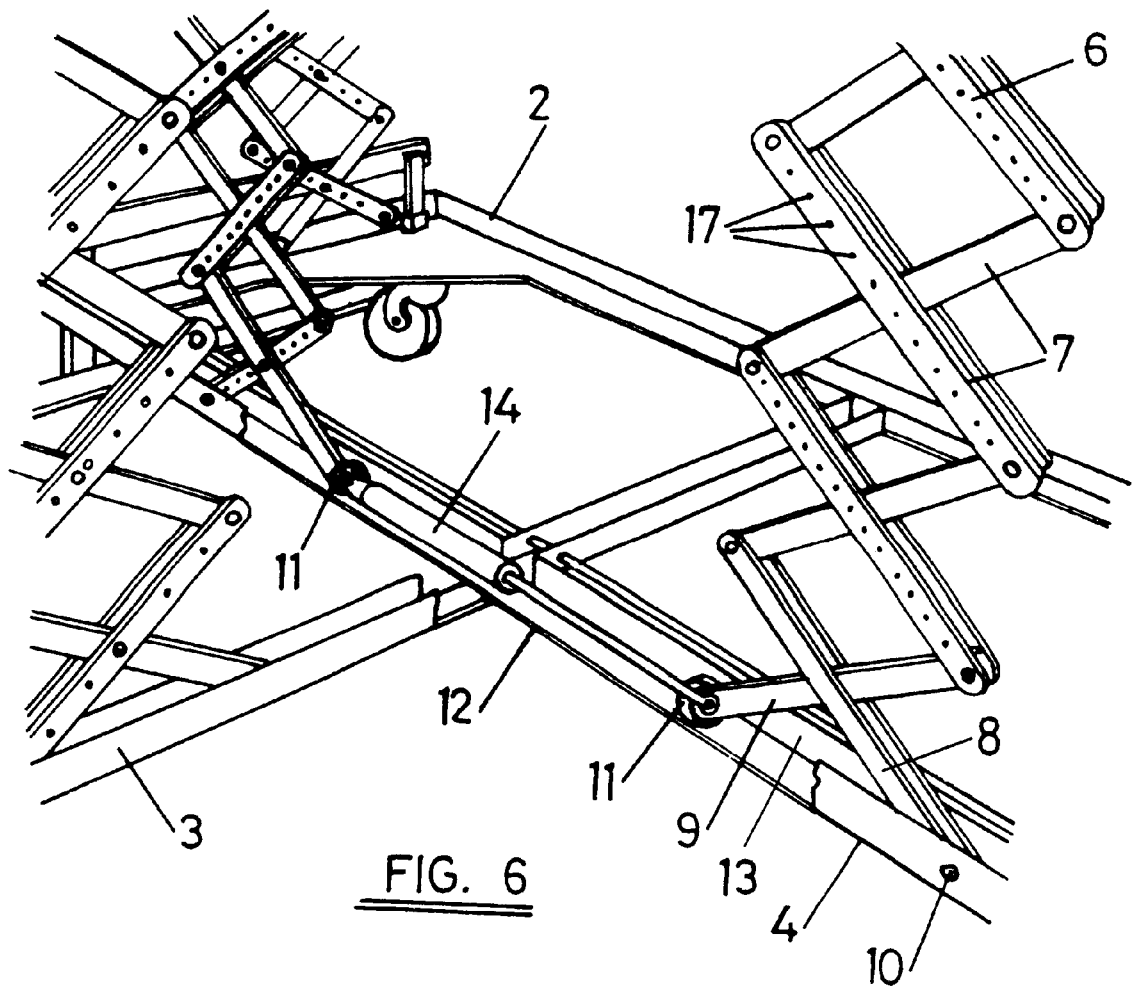
FIG. 6 is a partial perspective view of the lower container frame.

Scissors 6 are of traditional constitution, as can be better observed from FIG. 6, based on a pair of flat bars 7 which articulate with each other on their central part and consecutively at their ends. Regarding the two upper and lower end flat bars 8 and 9 of each scissors 5 and 6, flat bar 8 is attached to the corresponding side of the adjacent frame by means of an articulation axis 10, whilst the other flat bar 9 is provided at its free end with a rolling element which may move along a section of the frame.

Preferably, the upper and lower frames and the transversal 3 and longitudinal 4 central bars are constituted based on confronted "U" shaped profiles, the rolling element 11 bearing on the profile bottom 12, whilst axis 10 perpendicularly crosses walls 13 of the profiles.

The pairs of scissors 5 and 6, at least the coplanar ones 5, shall be related by their ends by means of pneumatic springs 14, FIG. 6, preferably connecting with the rolling elements 11, which shall impulse the scissors 5 and 6 towards their unfolded position to facilitate the mounting of the container.

As can also be appreciated from FIG. 6, the flat bars 7 of the scissors 5 are provided with orifices or anchorage 17 on which hooks or profiles may be attached for the assembly of trays 18 and 19. If no intermediate scissors 6 exist, said trays shall be of equal length to the frames 1 and 2 and of equal width or half the width of said frames. If intermediate scissors 6 exist, they may be placed in such a manner that all the trays have the same dimension, corresponding to a quarter of frames 1 and 2, such as the trays referenced with number 18, or may also include trays such as those referenced with number 19, which approximately correspond in their dimension to double that of trays 18.

The mounted position of the container shown in FIG. 1, is ensured by means of stiff columns 20 which are articulated by their upper end to upper frame 1 and bear at their lower part on frame 2. Said columns 20 shall be preferably made up of two telescopic sections 21 and 22 provided with anchorage pins or clips in the extended position shown in FIG. 1. As may be better appreciated from FIG. 4, section 21 articulates with the upper frame 1 by means of parallel rotation axis 23, which are aligned in twos.

External sections 22 corresponding to columns with aligned articulation axis are related to each other by means of crosspieces 24. The upper frame 1 is provided, at the corners of columns 20, with notches, FIG. 4, which permit the turning of said columns 20 from an upper collapsed position on the frame, shown in FIG. 2, and a vertical position shown in FIG. 1, as may be observed in FIG. 3.

Logically, the telescopic structure of columns 20 shall be necessary when the maximum height of the container may exceed the length of frames 1 and 2.

The nature both of the upper frames 1 and 2 and transversal 3 and longitudinal 4 central bars and scissors 5 and 6 may be metallic, for example of stainless steel. The trays 18 may be of any plastic material or of steel rods.

Figure 7:
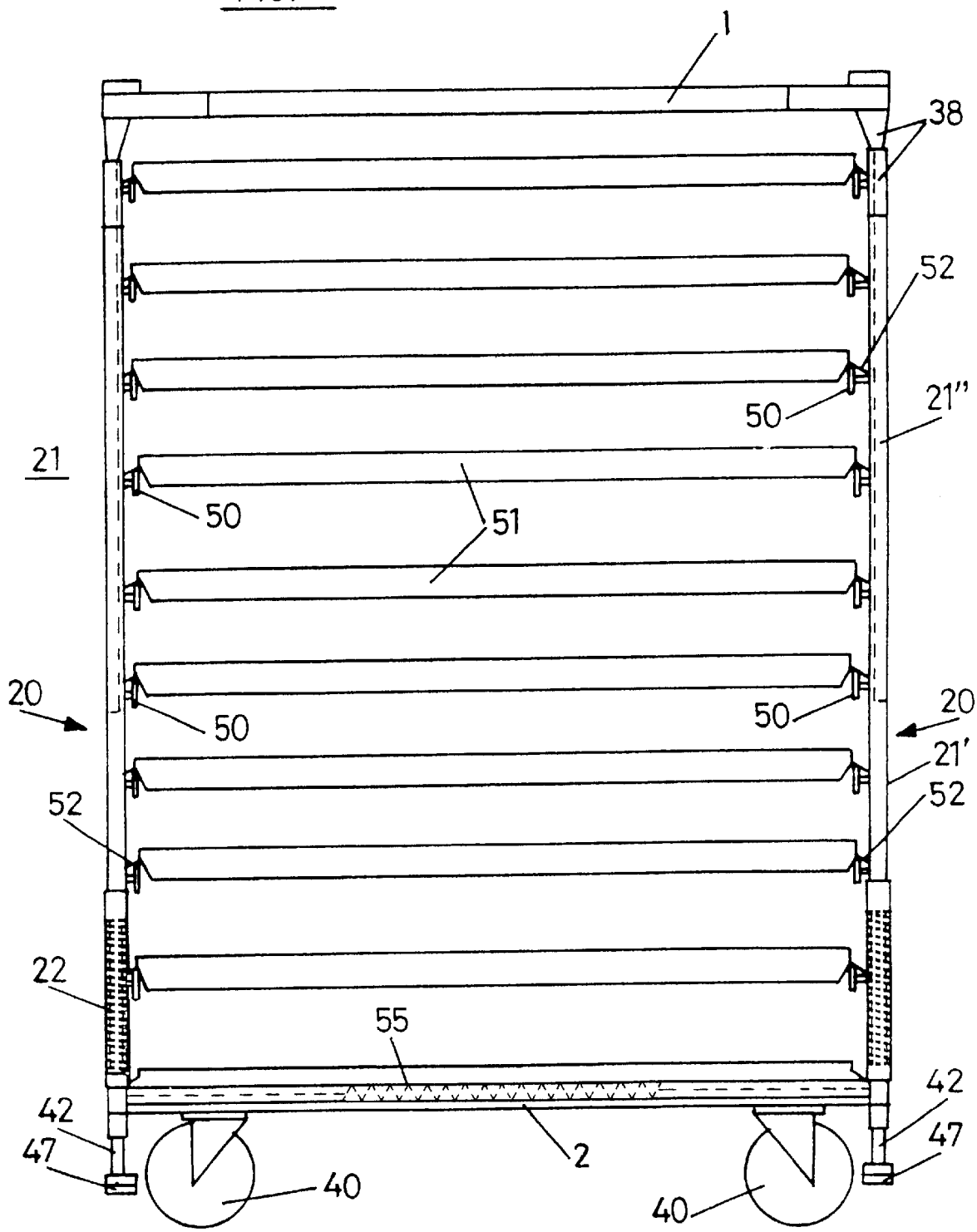
FIG. 7 is a front elevational view of a container constituted according to a second type of invention, in mounted and partially unfolded position.
Figure 8:
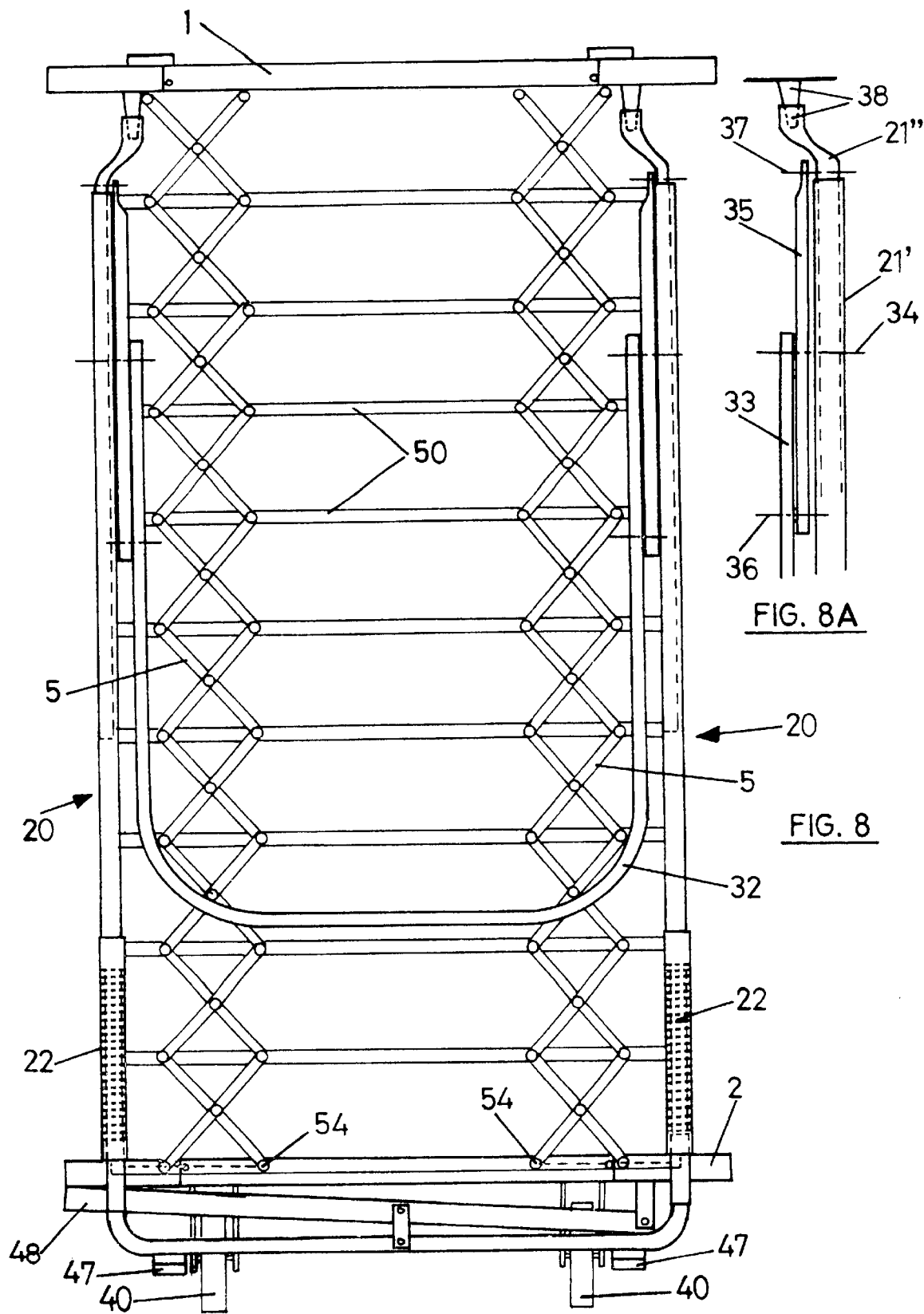
FIG. 8 is a side elevational view of the container of FIG. 7.

The container as shown in FIG. 7 and 8 constitutes two parallel and appreciably equal frames, an upper one referenced with number 1 and another lower one referenced with number 2, which relate by means of at least two pairs of transversal central bars 3, the two pairs of transversal central bars 3 remaining placed in correspondence with two of the opposite sides of frames 1 and 2, for their connection to the same. The container is completed with four columns which are generally referenced with number 20.

In accordance with this solution, each one of the columns 20 is made up of a lower tubular section 22 and of an upper telescopic post 21. As may be better observed from FIG. 9, the upper telescopic post 21 is comprised of an external section 21', and an internal section 21", telescopically fitted together.

Figure 11:
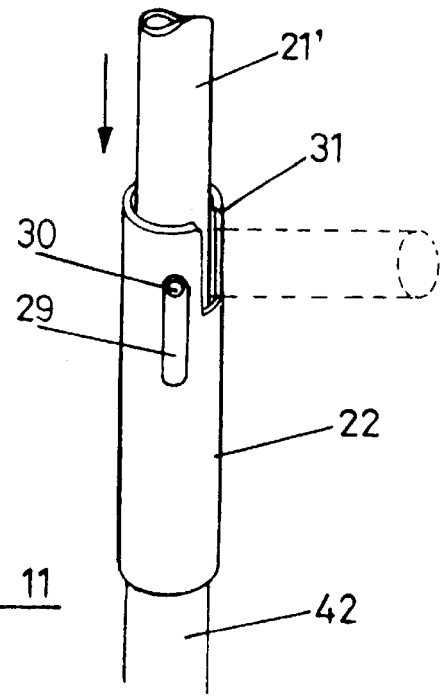
FIG. 11 shows a perspective view of the connection between the telescopic post and the lower section of each column.

As can be observed in FIG. 11, the lower tubular section 22 of each column receives the lower portion of the upper telescopic post external section 21', both components related by means of a pin 30 which acts as articulation axis. The lower tubular section 22 is provided with two diametrically opposite axial grooves, along the length of which, pin 30 can move. Furthermore, lower tubular section 22 is provided as from the upper edge, with a notch 31 of equal width or slightly larger than the diameter of the external section 21' of telescopic post 21.

With this constitution, when the upper telescopic post 21 moves in ascending direction, in such a way, that pin 30 reaches the top limit of grooves 29, the post can collapse until it occupies the position represented by means of dotted lines in FIG. 11.

On the contrary, when the post moves in descending direction, together with articulation pin 30 along grooves 29, the rotation of external section 21' and upper telescopic post 21 shall be prevented as regards the lower tubular section 22 of the columns.

Figure 9:
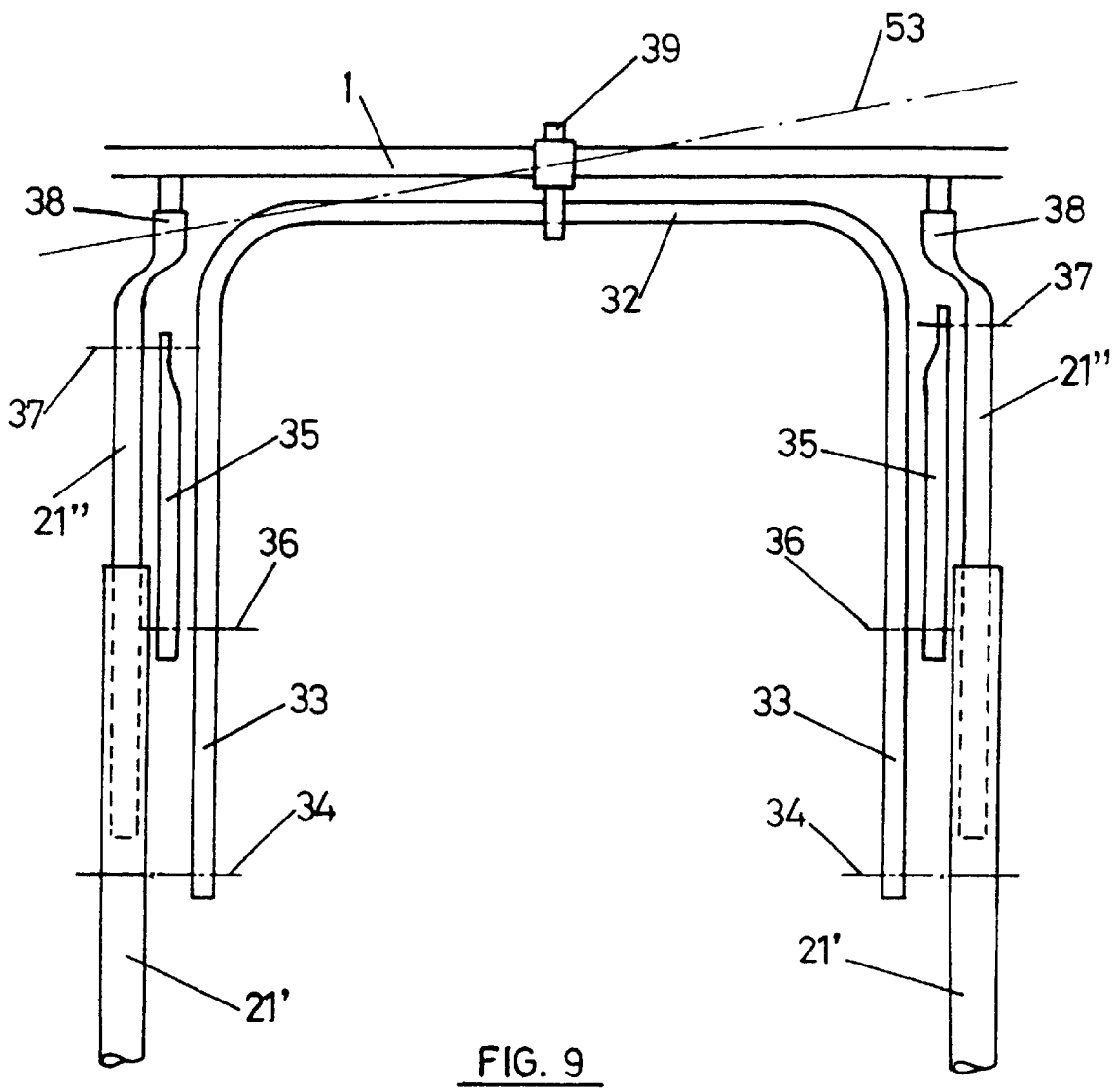
FIG. 9 is a partial side elevational view of the container, alike to FIG. 8, showing the columns in totally collapsed position.

The two columns 20 which are coplanar with each pair of folding arms 5 are related to each other, as can be better observed from FIGS. 8 and 9, by a 'C' shaped lever 32. This lever is articulated by the end of its side branches 33 to external section 21' of the upper telescopic post 21, by means of corresponding aligned axes 34. Additionally, the side branches 33 of this lever 32 is related with adjacent telescopic post internal section 21" by means of an arm 35 which is articulated at an end by means of axis 36 to branch 33, whilst on the opposite end it articulates, by means of an axis 37 with the post internal section 21".

With the constitution described, when lever 32 is collapsed in descending direction, such as is represented in FIG. 8, the telescopic posts internal section 21" is to be found in the maximum retracted position. On the contrary, when lever 32 is rotated in ascending direction, until it occupies the position represented in FIG. 9, internal section 21" of telescopic post 21 is to be found in its most extracted position, at which point columns 20 reach their maximum height.

Internal section 21" of telescopic posts 21 and the upper frame 1 are provided with coupling and dismountable confronted connectors 38, in such a manner, that the upper frame 1 can separate from columns 20.

The top frame 1 is provided with a hook or clamp 39, FIG. 9, to attach to lever 32 in its highest position, thus ensuring the maximum height of the container.

The lower frame 2 is provided with wheels 40.

Figure 10:
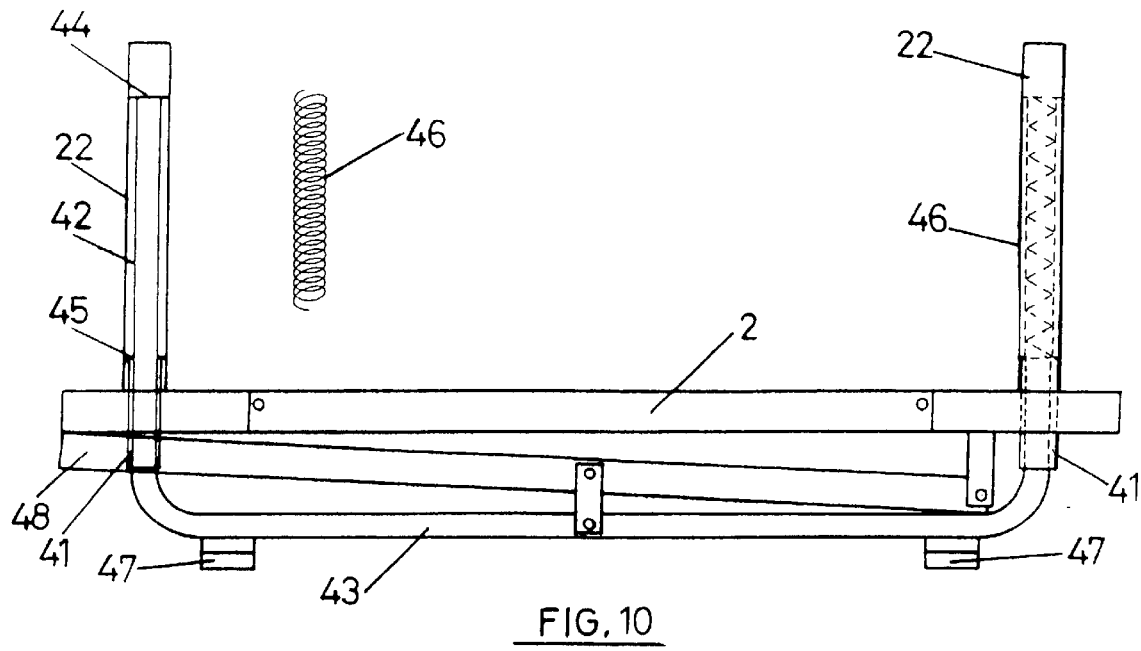
FIG. 10 is a side elevational view of the lower part of the container, including the lower frame, lower section of the columns and braking assembly.

The lower section 22 of the columns 20 is attached perpendicular to frame 2, such as is observed in FIGS. 7, 8 and 10. A coaxial bushing 41 crosses frame 2 to receive at its bottom part, a leg, both legs coupled to sections 22, coplanar with each pair of folding arms 5 being capable of remaining joined by a lower bar 43, adopting an inverted "C" shaped configuration. Legs 42 are finished off with an upper stop 44, with a compression spring 46 being assembled between the same and a lower support 45, which impulses legs 42 in ascending direction.

On the upper stop 44 shall bear the corresponding telescopic post external section 21', in such a manner that when the weight transmitted by said post to legs 42 reaches a certain value, it overcomes the stress of spring 46, producing the descent of said legs until they bear on the floor through braking shoes 47.

The assembly of legs 42 with the lower bar 43 and shoes 47 can be made to descend by acting on lever 48.

Every two telescopic posts 21 of the columns 20 related by means of lever 32, can be jointly collapsed.

Under said conditions, in order to fold the container, it is necessary to start by collapsing lever 32 in descending direction, as from the position represented in FIG. 9, once hook 39 has been released, until it occupies the position represented in FIG. 8. In this situation, frame 1 is dismounted, disconnecting at the top, folding arms 5 and the folding of the same in descending direction is proceeded with. Next, the telescopic posts 21 of the columns 20 are collapsed by pairs, towards the interior of the container, in such a way, that two or more containers can be laid-up with each other, the movement of legs 42 in descending direction also being possible in this position, until shoes 47 bear on the floor.

As can be observed in FIGS. 7 and 8, the pairs of folding arms 5 carry internal bars or profiles 50, placed at equal height, on the two opposite pairs of arms. These bars or profiles determine guides for the assembly of trays 51 by sliding, which may be provided at their sides with wings 52 formed to couple on the bars or profiles 50.

Returning to FIG. 9, arms 35 belonging to each pair of posts related by lever 32, may be of different lengths, so that all the trays, as well as the top frame 1, run with a certain inclination, represented by the discontinuous line 53. In this manner, the trays 51 remain inclined, in descending direction, towards the front, to facilitate the exposition of the contained products.

With the purpose of carrying out the container unfolding operation without great efforts, the lower sliding end 54 of the opposed scissors 5 and 6 are related to each other by means of a tensile spring 55, FIG. 7.

Although, throughout this Specification examples have been given with a minimum of four folding arms 5 and four columns 20, the container can be equally carried out with two folding arms 5 and two columns 20, in which case, the arrangement of each side would be the one represented in FIG. 3.

Figure 12:
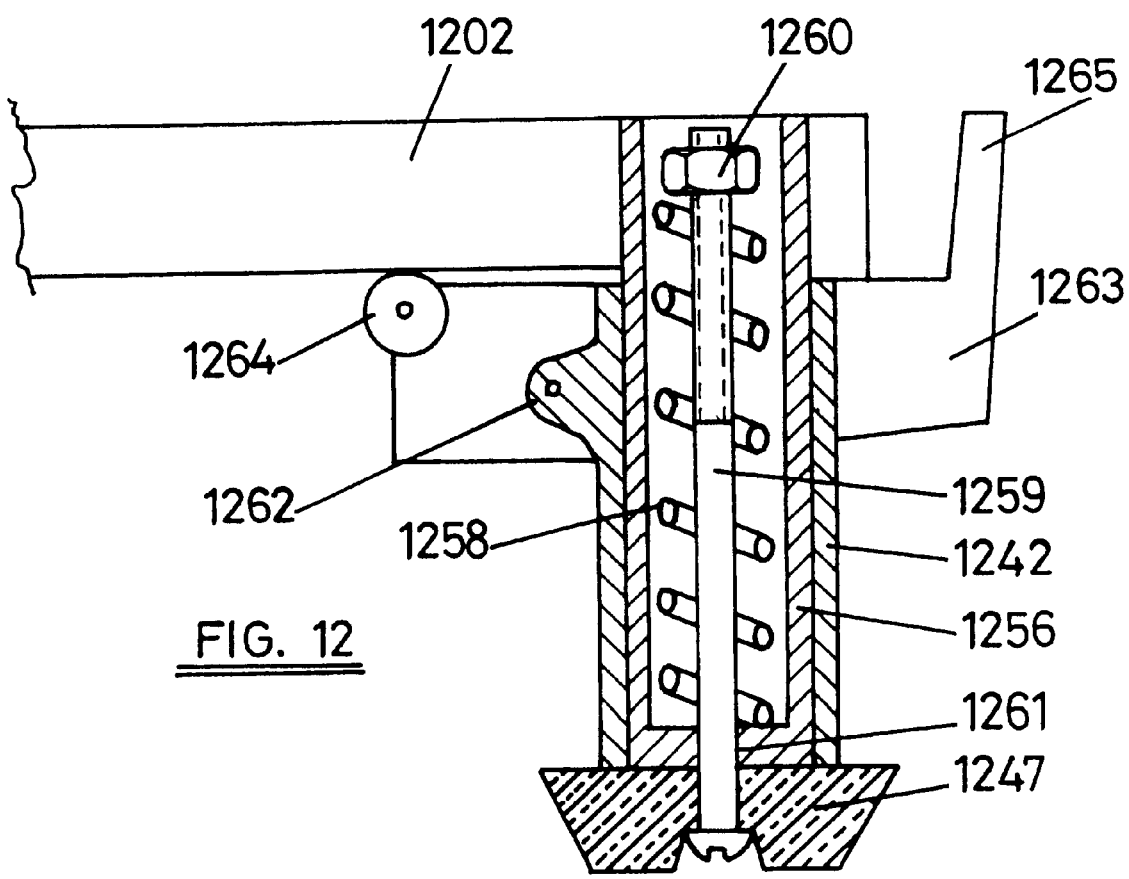
FIG. 12 shows an axial section of a braking and supporting system.

Finally, and as regards FIG. 12, a variation of the brake-support can be observed, which in this case, operates in individual form for each corner of the container, and as can be observed, is constituted by one leg 1242 provided at its end with a brake shoe and a support 1247 and which is assembled in axially moveable form, inside a tubing 1256 which is joined forming integral part with the lower frame 122. Said leg 1242 is constantly pushed towards the inside by spring 1258 assembled around screw 1259 between nut 1260 of the same and the bottom 1261 of the tubing 1256. Leg 1242 is provided with a lug 1262 on which lever 1263 is assembled with rotational possibilities and is provided at its free end with a slide 1264 which facilitates its displacement over the lower frame 122 when the other end 1265 of lever 1263 is activated.

What is claimed is:

1. A folding container, comprised of:

a lower equal frame;

an upper equal frame parallel to said lower equal frame;

said lower and upper equal frames having a position of maximum separation and a position of minimum separation;

first and second folding arms which connect said lower and upper equal frames;

an intermediate detachable tray assembled between said first and second folding arms;

first and second mounting columns;

each of said first and second mounting columns comprised of telescopic sections;

said first and second mounting columns pivotally articulated to one of said equal frames to permit movement of said lower and upper equal frames between said positions of maximum separation and minimum separation;

wherein:

the folding arms each comprise flat structured scissors elements;

said flat structured scissors elements further comprising articulated flat bars arranged in pairs;

at least one of said pairs of articulated flat bars of each said folding arm comprising a first flat bar and a second flat bar;

each said first flat bar having a first end;

each said second flat bar having a second end;

said first ends of said first flat bars being pivotally articulated to said lower equal frame;

said second ends of said second flat bars being slidable along said lower equal frame to permit movement of said lower and upper equal frames between said positions of maximum separation and minimum separation; and wherein the first and second mounting columns bear on the lower equal frame when the lower and upper equal frames are in the maximum separation position.

2. A container according to claim 1, wherein:

said lower equal frame further comprises a lower crosspiece having a first axis and a first "U" shaped profile aligned with said first axis;

said upper equal frame further comprises an upper crosspiece having a second axis and a second "U" shaped profile aligned with said second axis;

third and fourth folding arms assembled between said upper and lower crosspieces.

3. A container according to claim 1, wherein:

said telescopic sections of said first mounting column comprise a first lower section having a first lower end and a first upper end and a first upper telescopic post;

said telescopic sections of said second mounting column comprise a second lower section having a second lower end and a second upper end and a second upper telescopic post;

said first and said second lower sections being attached by said first and second lower ends to the lower equal frame;

said first upper end having a first pin having a first pin axis;

said second upper end having a second pin having a second pin axis;

said first upper telescopic post having a third lower end and a third upper end, said third lower end of said first upper telescopic post pivotally articulated to the first lower section by said first pin;

said first upper telescopic post having a first mounted position, in which it remains as an extension of the first lower section, and a first folded position, in which it is approximately parallel to said lower equal frame;

said second upper telescopic post having a fourth lower end and a fourth upper end, said fourth lower end of said second upper telescopic post pivotally articulated to said second lower section by said second pin;

said second upper telescopic post having a second mounted position, in which it remains as an extension of the second lower section, and a second folded position, in which it is approximately parallel to said lower equal frame;

a set of levers;

said first upper telescopic post being extendable by said set of levers which control a length of said first upper telescopic post; and said third and fourth upper ends of said first and second telescopic posts being connected to said upper equal frame.

4. A container according to claim 3, wherein:

the set of levers further comprises:

a "U" shaped lever having a first side branch with a first free end and a second side branch with a second free end;

said first side branch articulated by said first free end to said first mounting column;

said second side branch articulated by said second free end to said second mounting column;

a first bar having a fifth end and a sixth end;

said first bar articulated at said fifth end to said first side branch and at said sixth end to said first upper telescopic post; and a second bar having a seventh end and an eighth end;

said second bar articulated at said seventh end to said second side branch and at said eighth end to said second upper telescopic post;

wherein said first bar is of greater length than said second bar, so as to raise said first and second mounting columns in different magnitudes.

5. A container according to claim 3, wherein each of said first and second lower sections of said first and second mounting columns is generally tubular;

said first lower section receiving said first upper telescopic post;

said second lower section receiving said second upper telescopic post;

said first lower section further comprising a first axial groove in a first wall of said first lower section;

said first lower section being slidably connected to said first upper telescopic post by said first pin;

said second lower section further comprising a second axial groove in a second wall of said second lower section;

said second lower section being slidably connected to said second upper telescopic post by said second pin.

6. A container according to claim 3, wherein:

said first and second folding arms further comprise first and second orifices, respectively;

said intermediate detachable tray being guidably connected to respective said first and second orifices.

7. A container according to claim 3, wherein:

said lower equal frame further comprises a compression element; and said first folding arm has an unfolded position;

said compression element urging said first folding arm towards said unfolded position.

8. A container according to claim 3 further comprising:

a brake-support comprised of a first tubing;

said first tubing forming an integral part of said lower equal frame;

a second tubing telescopically assembled to said first tubing;

said second tubing provided with a projection on which an elbowed lever is pivotally assembled;

said elbowed lever comprising a slide which bears and moves on said lower equal frame;

a support foot having a top position;

a spring assembled between a lower part of the first tubing and a nut of a screw which attaches the support foot to said first tubing; wherein said spring constantly biases said support foot towards said top position.

9. A container according to claim 1, further comprising:

a brake-support comprised of a first tubing;

said first tubing forming an integral part of said lower equal frame;

a second tubing telescopically assembled to said first tubing;

said second tubing provided with a projection on which an elbowed lever is pivotally assembled;

said elbowed lever comprising a slide which bears and moves on said lower equal frame;

a support foot having a top position;

a spring assembled between a lower part of the first tubing and a nut of a screw which is attached to the support foot;

wherein said spring constantly pushes said support foot towards said top position.

* * * * *